(12) United States Patent
Vidal Drummond et al.

(10) Patent No.: US 9,257,745 B2
(45) Date of Patent: Feb. 9, 2016

(54) PHOTONIC SYSTEM AND METHOD FOR TUNABLE BEAMFORMING OF THE ELECTRIC FIELD RADIATED BY A PHASED ARRAY ANTENNA

(75) Inventors: Miguel Vidal Drummond, Estarreja (PT); Rogério Nunes Nogueira, Aveiro (PT)

(73) Assignee: INSTITUTO DE TELECOMUNICACOES, Lisboa (PT)

( * ) Notice: Subject to any disclaimer, the term of this patent is extended or adjusted under 35 U.S.C. 154(b) by 484 days.

(21) Appl. No.: 13/808,996

(22) PCT Filed: Dec. 9, 2010

(86) PCT No.: PCT/PT2010/000061
§ 371 (c)(1),
(2), (4) Date: Jan. 8, 2013

(87) PCT Pub. No.: WO2012/005618
PCT Pub. Date: Jan. 12, 2012

(65) Prior Publication Data
US 2013/0169483 A1 Jul. 4, 2013

(30) Foreign Application Priority Data
Jul. 8, 2010 (PT) ........................................ 105190

(51) Int. Cl.
| | |
|---|---|
| *H01Q 3/00* | (2006.01) |
| *H01Q 3/22* | (2006.01) |
| *G01J 1/04* | (2006.01) |
| *H01Q 3/26* | (2006.01) |
| *H04B 10/2575* | (2013.01) |

(52) U.S. Cl.
CPC ........... *H01Q 3/2682* (2013.01); *H01Q 3/2676* (2013.01); *H04B 10/25752* (2013.01); *H04B 2210/006* (2013.01)

(58) Field of Classification Search
USPC ............. 342/368, 369, 373, 375; 250/227.12; 385/2, 3
See application file for complete search history.

(56) References Cited

U.S. PATENT DOCUMENTS

| | | | |
|---|---|---|---|
| 5,274,385 A | 12/1993 | Riza | |
| 5,333,000 A * | 7/1994 | Hietala et al. | 342/368 |
| 5,933,001 A * | 8/1999 | Hubbell | 324/96 |
| 5,978,125 A | 11/1999 | Yao | |
| 6,124,827 A | 9/2000 | Green | |
| 7,558,450 B2 | 7/2009 | Khurgin | |

OTHER PUBLICATIONS

International Search Report for International Application No. PCT/PT2010/000061 mailed Apr. 27, 2011.

* cited by examiner

*Primary Examiner* — Dao Phan
(74) *Attorney, Agent, or Firm* — Pearl Cohen Zedek Latzer Baratz LLP (57) ABSTRACT

This invention discloses a photonic system to beamform the electric field yield by a phased array antenna. The system function relies on a photonic tunable delay line, which consists on an optical Mach-Zehnder interferometer with a predefined time delay difference between arms. The time delay is tuned by adjusting the coupling ratio between the power applied to each one of the interferometer's delay lines. Three embodiments are proposed, wherein one of them just uses a single delay line and a single monochromatic light source, independently of the quantity of the array elementary antennas.

10 Claims, 6 Drawing Sheets

PHOTONIC SYSTEM AND METHOD FOR TUNABLE BEAMFORMING OF THE ELECTRIC FIELD RADIATED BY A PHASED ARRAY ANTENNA

CROSS-REFERENCE TO RELATED APPLICATIONS

This application is a National Phase Application of PCT International Application No. PCT/PT2010/000061, International Filing Date Dec. 9, 2010, claiming priority of Portuguese Patent Application No. 105190, filed Jul. 8, 2010, which is hereby incorporated by reference.

FIELD OF THE INVENTION

This invention discloses a photonic system and method with the purpose of beamforming the electric field yield by a phased array antenna (PAA). The system relies on a photonic tunable optical delay line (TODL), which is an Mach-Zehnder optical interferometer with a predefined differential time delay between arms. The time delay is tuned by adjusting the coupling ratio between the power applied to each one of the interferometer's delay lines. Three embodiments are proposed, wherein one of them just uses a single delay line and a single monochromatic light (ML) source, independently of the quantity of elementary antennas of the phased array. The application of the described TODL in a photonic system with the purpose of beamforming the electric field yield by a PAA has not been found in the present state of the art. The proposed system is appropriate to wireless communication systems with high frequency RF carriers, which allow handling with high data transmission rates.

The proposed invention presents a novel approach in beamforming systems for the electric field radiated by a PAA. PAA's are being increasingly used, because such antennas allow directing the radiated beam precisely to any target direction, without using any mechanical displacement. Since the bandwidth of data transmission is growing in wired or wireless communication systems, interconnecting systems between both these types of communication systems are required, which allow high data transmission rates. Let us consider the following example: a wireless network system with high data transmission rates (≤1 Gb/s) can use a radio over fiber (RoF) system to connect a central office to a remote PAA. Subsequently, the PAA will direct the beam in a target direction using the proposed system, since it allows the acceptance of high data transmission rates. Another area of interest outside communication systems is radio astronomy, which requires advanced antenna technology to monitor signals arriving from outer space with low power and high bandwidths.

In comparison with the photonic beamforming techniques reported so far, the proposed system is rather simple and is based on a well-known optics device, the Mach-Zehnder delay interferometer (MZDI). Its implementation is made with commercially available components. It also allows a very fast beam tuning, particularly when its implementation uses integrated optics. According to its inventors point of view, the main advantage is that it just requires one optical delay line (the birefringent medium in the embodiment shown in FIG. 3) and a single ML source, independently of the quantity of elementary antennas. This feature was not found in any techniques reported in prior art's literature.

BACKGROUND ART DESCRIPTION

A PAA comprises N antennas disposed along the three spatial dimensions. The antennas which form the PAA are known as elementary antennas. A PAA allows the optimization and the beamforming of the radiated electrical field through the adjustment of the amplitude and phase of the radio frequency (RF) signals sent to each elementary antenna. This is an exclusive feature for the PAA's, since in an individual antenna the optimization of the radiated electrical field depends on the antenna's design. In addition, the beamforming of the radiated electrical field depends on the spatial orientation of the antenna.

As previously said, the beamforming of the electrical field radiated by the PAA can be controlled through the phase of the RF signals applied to each elementary antenna. More precisely, the PAA can be fed by a single RF signal, which is split to all elementary antennas including a tunable phase shift. Although tunable, the phase shift is constant. This means the induced phase shift value is correct only for a specific RF frequency. In a PAA, this implies that the emitted frequency should be constant. Otherwise, different RF frequencies get different phase shifts, and so the beamforming of the electric field becomes dependent on the emitted frequency. In the case of data transmission over one RF carrier frequency, this implies that the data signal bandwidth should be as low as possible. Since there are many applications with high bandwidth (e.g., RADAR signals, Gb/s wireless networks, radio astronomy, etc.), the beamforming of the radiated electric field cannot be efficiently performed with such a technique.

This problem can be solved using phase shifts that depend on RF frequency. In practice, a phase shift depending on frequency consists in a time delay line. Therefore, instead of a phase shift, each elementary antenna should include a tunable time delay. The electrical implementation of a tunable time delay is particularly challenging at high frequencies, since increasing time delays implies increasing the length of the delay line, which in turn leads to greater insertion losses and a reduction in bandwidth. Such disadvantages are overcome using photonic implementations of tunable delay lines. The advantages of photonic systems consist on low losses, broad bandwidth, lighter weights, smaller dimensions and immunity to electromagnetic interference. Generally, a PAA with tunable photonic delay lines is characterized in that it has an electro-optical modulator, which converts the RF signal to the optical domain, followed by an optical processing system which delays and distributes the modulated optical signal according to what the needs of the different antennas are. The optical signals are converted to the electrical domain using photodetectors.

The patents summarized below describe different implementations of photonic TODL's, which can be applied to PAA.

U.S. Pat. No. 5,428,218 discloses a photonic TODL based on spatial multiplexing. In such free-space implementation, the optical signal is directed into a given optical fiber through the adjustment of mirrors. As different optical fibers have different lengths, one can get a discrete tuning of the time delay added to the optical signal. This implementation also includes the possibility of having a multi-beam system, e.g., the system can be simultaneously used by more than one optical signal.

U.S. Pat. No. 5,978,125 discloses a photonic TODL based on polarization multiplexing. In a birefringent medium, an optical signal with a specific state-of-polarization (SOP) has a higher time delay than the orthogonal SOP. By selecting one of the two SOP's, the added time delay can then be controlled. This method is described in a cascaded configuration, in which serial birefringent media are intercalated by polarization controllers (PC's). As a result, a discrete delay tuning is obtained.

U.S. Pat. No. 5,461,687 discloses a photonic TODL based on dispersive means. By tuning the wavelength of the input optical signal the path by which the signal propagates changes, resulting in a tunable time delay. In this patent, the dispersive mean is implemented in a free space using a diffraction grating. Another possible option is to use fiber Bragg gratings (FBG's) located in different points of an optical fiber.

U.S. Pat. No. 5,751,466 discloses a photonic TODL which uses the frequency response of a photonic bandgap device. An example of such a device is a FBG. This device consists of a dielectric structure in which the refractive index varies longitudinally. The control of the refractive index's variation along the structure results in changing the frequency response of the device, therefore affecting the time delay added to the photonic signal.

U.S. Pat. No. 7,558,450 B2 discloses a photonic TODL composed by three resonant elements coupled to a waveguide. This implementation is limited to single sideband (SSB) optical signals. The symmetric displacement in the frequency of two resonant elements enables the adjustment of time delay induced to the RF carrier. The third resonant element adjusts the phase of the optical carrier (OC) in order to avoid involuntary phase shifting of RF signal. Of greater importance than the tuning method, is the fact that this patent is clearly appropriate to RF signals without any spectral content between the optical and the RF carriers. As a result, the TODL's frequency response is irrelevant at frequencies located between the RF carrier and the OC.

BRIEF DESCRIPTION OF THE DRAWINGS

The following description is based on the drawings attached hereto, which are represented without any restrictions.

DETAILED DESCRIPTION OF THE INVENTION

The system proposed for beamforming the electric field yield by a PAA can be divided in three subsystems. In the first subsystem, the RF signal modulates a monochromatic optical carrier. The resulting modulated optical signal is split into N copies, where N is the number of elementary antennas. Each copy is introduced into a TODL, and then reconverted to the electrical domain by means of a photodetector. Each photodetector is connected to the respective elementary antenna.

The key element of a beamforming system is the tunable delay line, because generally a PAA with N antennas requires N tunable delay lines. The proposed TODL consists of a MZDI with two arms. The MZDI is composed of an input optical coupler to which two delay lines and an output coupler which adds the signals coming from both lines. The delay lines have a fixed time delay difference τ. One of the optical couplers has a tunable coupling ratio, i.e., the optical power ratio in the two delay lines can be tuned. According to what is claimed in patent PT 104237, the proposed MZDI consists of an optical filter with tunable response, which approximately corresponds to a weighted average of the delay lines responses. The tuning is carried out through the adjustment of the optical power ratio between the two delay lines. As a result, a desired TODL with a tuning ranging from 0 to τ is obtained. In terms of a mathematic expression, the frequency response of the MZDI is given by $$H(f) = \frac{\sqrt{2}}{2}\left[\alpha + \sqrt{1-\alpha^2}\, e^{-j2\pi f \tau}\right], \quad (1)$$

where $0 \leq \alpha \leq 1$ is the coupling ratio and f is the frequency. The amplitude response $\|H(f)\|^2$ and the group delay $\tau(f)$ can be derived from (1), $$\|H(f)\|^2 = \frac{1}{2}\{1 + 2\alpha\sqrt{1-\alpha^2}\cos(2\pi f \tau)\}, \quad (2.1)$$

$$\tau(f) = \tau\left\{\frac{1-\alpha^2+\alpha\sqrt{1-\alpha^2}\cos(2\pi f \tau)}{1+2\alpha\sqrt{1-\alpha^2}\cos(2\pi f \tau)}\right\}. \quad (2.2)$$

Figure 1:
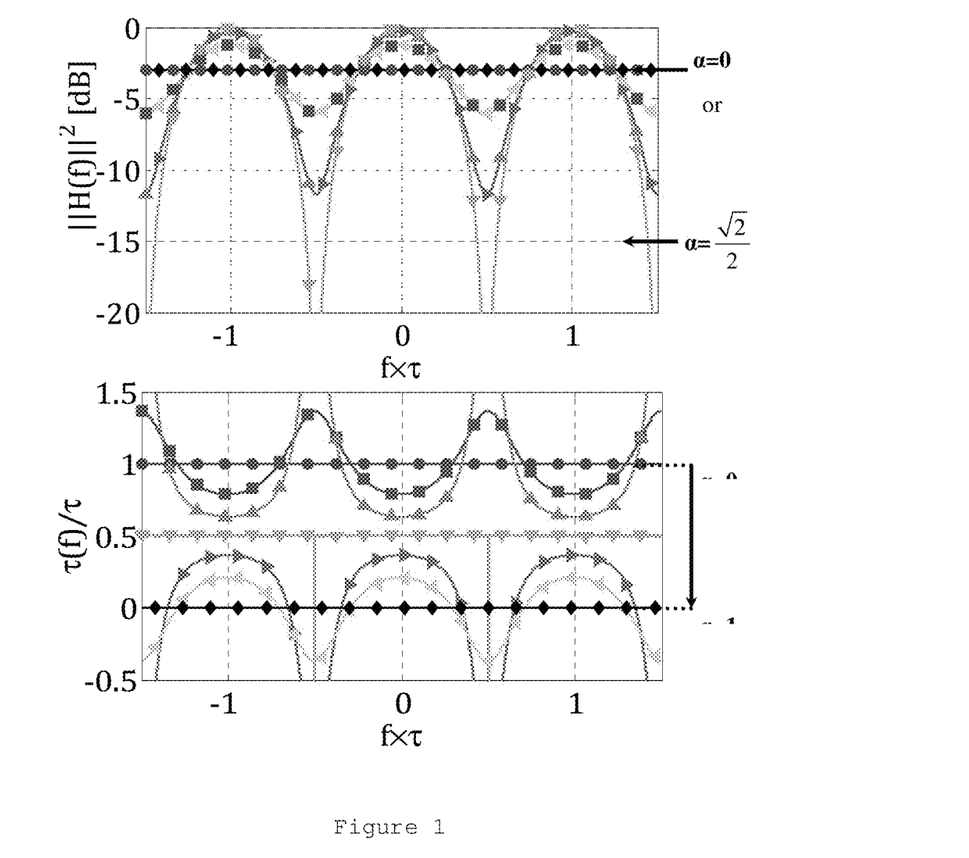
In FIG. 1 the response in amplitude and the photonic TODL group delay, considering different coupling ratios α among the power applied to each one of the interferometer's optical delay lines.

Both derived equations show that the TODL has a periodic frequency response with a period 1/τ. The amplitude response and the group delay are depicted in FIG. 1 for different values of α. As predicted by (2.1) and (2.2), both the amplitude response and the group delay are affected by α. As a result, the optical signal must be properly centered with the MZDI's frequency response. The absolute value of the amplitude response can be adjusted by means of variable optical attenuators (VOA's), located at the input or output of the TODL's, or using electrical amplifiers for the signals detected.

Generally, a RF signal modulated over an OC has three spectral lines located at $f_0-f_{RF}$, $f_0$ and $f_0+f_{RF}$, where $f_0$ is the OC frequency and $f_{RF}$ is the frequency of the RF signal. In the case of data transmission, copies of the transmitted sequence spectrum are centered at the three spectral lines. Thus, there are two ways for centering the modulated signal spectrum with the MZDI's frequency response. The first one consists of setting all the three spectral lines within a single period of the MZDI's response. The other way makes use of the fact that the TODL's frequency response is irrelevant to frequencies located between the RF carriers and the OC. Each one of the spectral lines is then centered at different maxima of the MZDI's amplitude response.

The implementation of the proposed photonic system for beamforming the electric field radiated by a PAA is presented through five different architectures.

Proposed Embodiments

Figure 2:
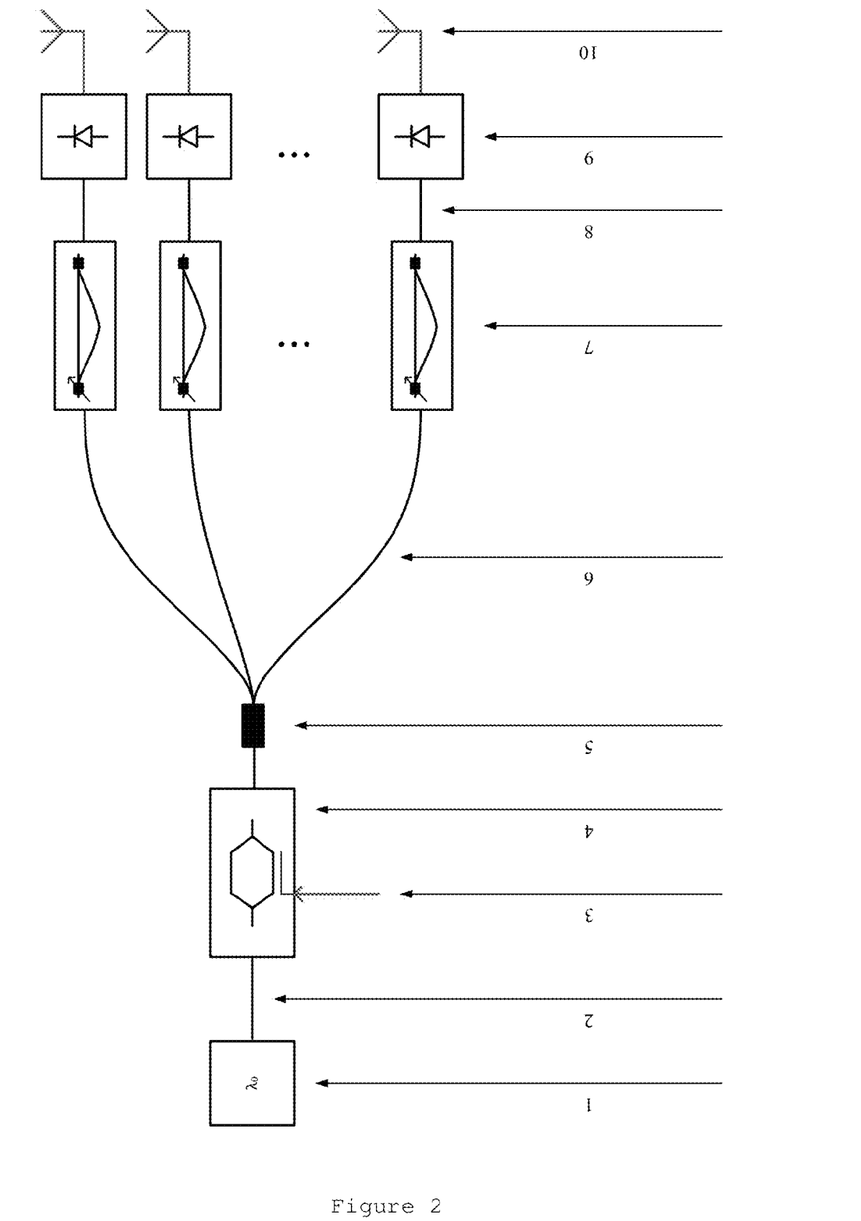
FIG. 2 shows a first embodiment of the invention.

The first proposed embodiment is shown in FIG. 2. This embodiment comprises a ML source (1), optical connections (2), (6), (8), an electro-optic modulator (4), a 1 to N optical signal splitter (5), N TODL's based on the proposed MZDI (7), N photodetectors (9) and N elementary antennas (10). By means of an electro-optic modulator (4), the monochromatic signal generated by the light source (1) is modulated by the electric RF signal (3) which will be radiated by the PAA. The modulated optical signal is split into N copies using a 1 to N optical splitter (6). Each one of the N copies is input into a TODL (7), which consists of a MZDI (7) with two arms and tunable coupling ratio. Each arm of the MZDI is a fixed optical delay line, where the propagation time difference of both arms is T. The time delay added to each copy of the modulated signal, before such copy enters its TODL (7), can be predefined by the length of the optical connections (6). After being time delayed, each copy is converted to the electrical domain using a photodetector (9) and subsequently sent to the respective elementary antenna (10). Briefly, the direction of the radiated electrical field is defined by manipulating the coupling ratios for the N TODL's (7).

Figure 3:
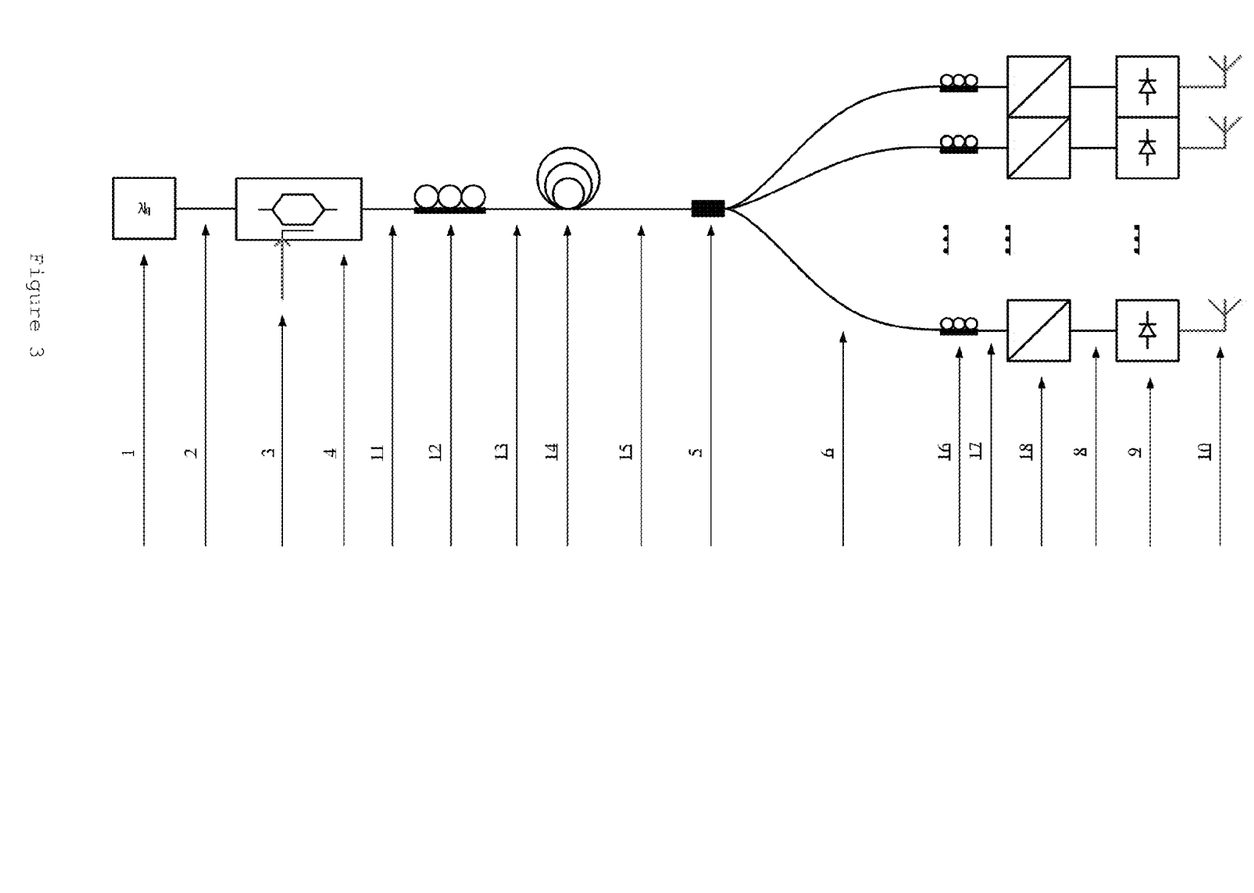
FIG. 3 shows a second embodiment of the invention.

The second embodiment is shown in FIG. 3. This embodiment also comprises a ML source (1), optical connections (2), (6), (8), an electro-optic modulator (4), a 1 to N optical signal splitter (5), N photodetectors (9) and N antennas (10). The new components are PC's (12), (16), a birefringent medium (14), N polarizers (18), and additional optical connections (11), (13), (15) and (17). This embodiment is essentially an optimized version of the embodiment depicted in FIG. 2. Instead of the N independent MZDI's (7), the N interferometers of this embodiment share the input optical coupler. The modulated optical signal has a linear polarization state at the output of the electro-optic modulator (4). The birefringent medium (14) allows propagation of an optical signal along two orthogonal polarization axes, which have different propagation velocities. Therefore, this medium allows obtaining a time delay $\tau$ between two orthogonally polarized optical signals aligned with the orthogonal polarization axes of the medium. The PC (12) sets the SOP of the modulated optical signal at an angle of 45° relative to one of the axes of the birefringent medium (14). At the output of said birefringent medium (14) two modulated optical signals, orthogonally polarized and time delayed by $\tau$ between each other, are obtained. So, the PC (12) and the birefringent medium (14) are the input optical coupler and the delay lines of the proposed MZDI's. The optical splitter (5) is used to obtain N copies of the orthogonally polarized optical signals. Depending on the angular orientation set by the PC's (16), the orthogonally polarized signals are added with different weights using the polarizers (18). Hence, the PC's (16) and the polarizers (18) are the output optical couplers with tunable coupling ratio of the proposed MZDI's. After being time delayed, each signal copy is converted to the electrical domain using a photodetector (9) and subsequently sent to its respective elementary antenna (10). Briefly, the direction of the radiated electrical field is defined through the manipulation of the PC's (16).

Figure 4:
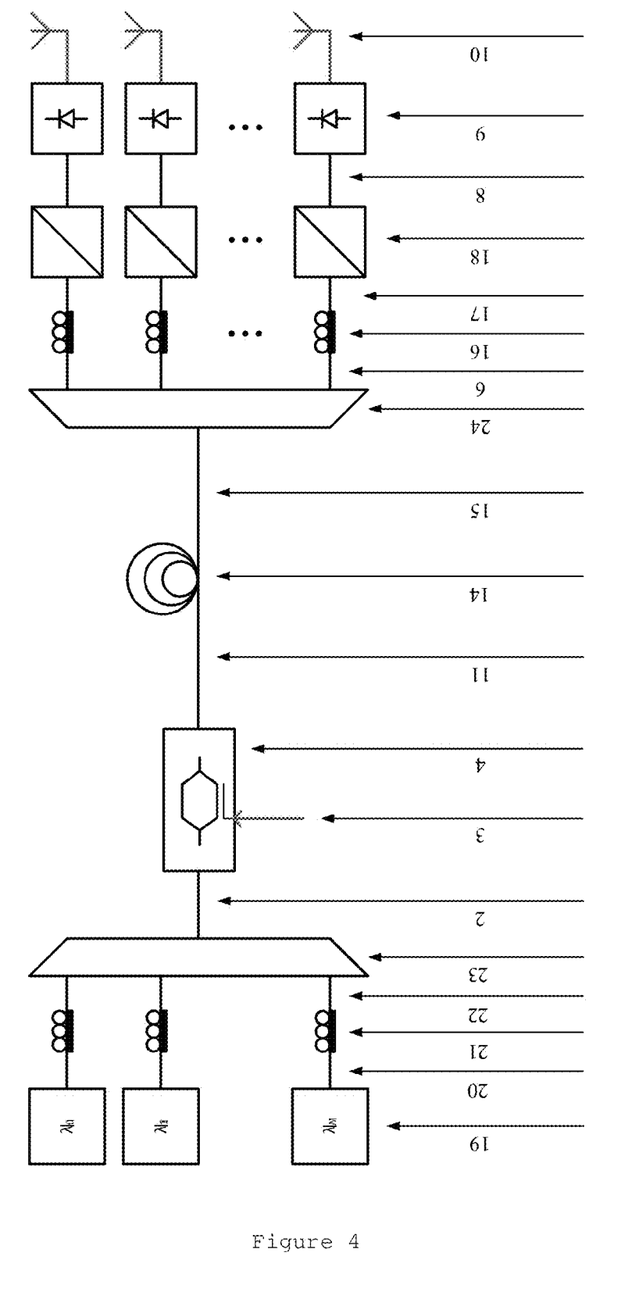
FIG. 4 shows a third embodiment of the invention.

The third embodiment is shown in FIG. 4. This embodiment comprises N ML sources (19) optically connected to N PC's (21). The signals generated by the N ML sources are multiplexed in the wavelength, using a wavelength multiplexer (23) which is optically connected to the electro-optic modulator (4). All multiplexed signals are modulated the same way, and then introduced into the birefringent medium (14). The multiplexed signals at the output of the birefringent medium are now de-multiplexed using a wavelength de-multiplexer (24) with N outputs, where each one of the N outputs is connected to a PC (16) and a polarizer (18). Several optical connections are presented at (20), (22), (2), (11), (15), (6), (17) and (8). Of course, the N photodetectors (9) and N elementary antennas (10) are the same as in previously described embodiments. Although previous embodiments are based on a ML source (1) and an optical splitter (5) which is not sensitive to the wavelength, the present embodiment is based on wavelength multiplexing for N ML sources. The optical splitter (5) which is not sensitive to the wavelength is replaced by a wavelength multiplexer (23) and de-multiplexer (24). The MZDI associated with each ML source is now composed by a PC (21), the birefringent medium (14), another PC (16) and its respective polarizer (18). The coupling ratio and consequently the time delay associated to a ML source can be tuned through the PC (21). Here, all the PC's (16) have the same function, which is to align the polarization axis of the birefringent medium (14) at an angle of 45° relative to one of the polarizer's axes (18). Such functions belonging to PC's (21) and (16) can be performed by PC's (16) and (21) respectively. It should be noted that, in the first situation, it is required that the electro-optic modulator is not sensitive to the polarization of the ML sources (19). Therefore, in this embodiment the MZDI's can have both the input and output optical couplers with tunable coupling ratio.

Figure 5:
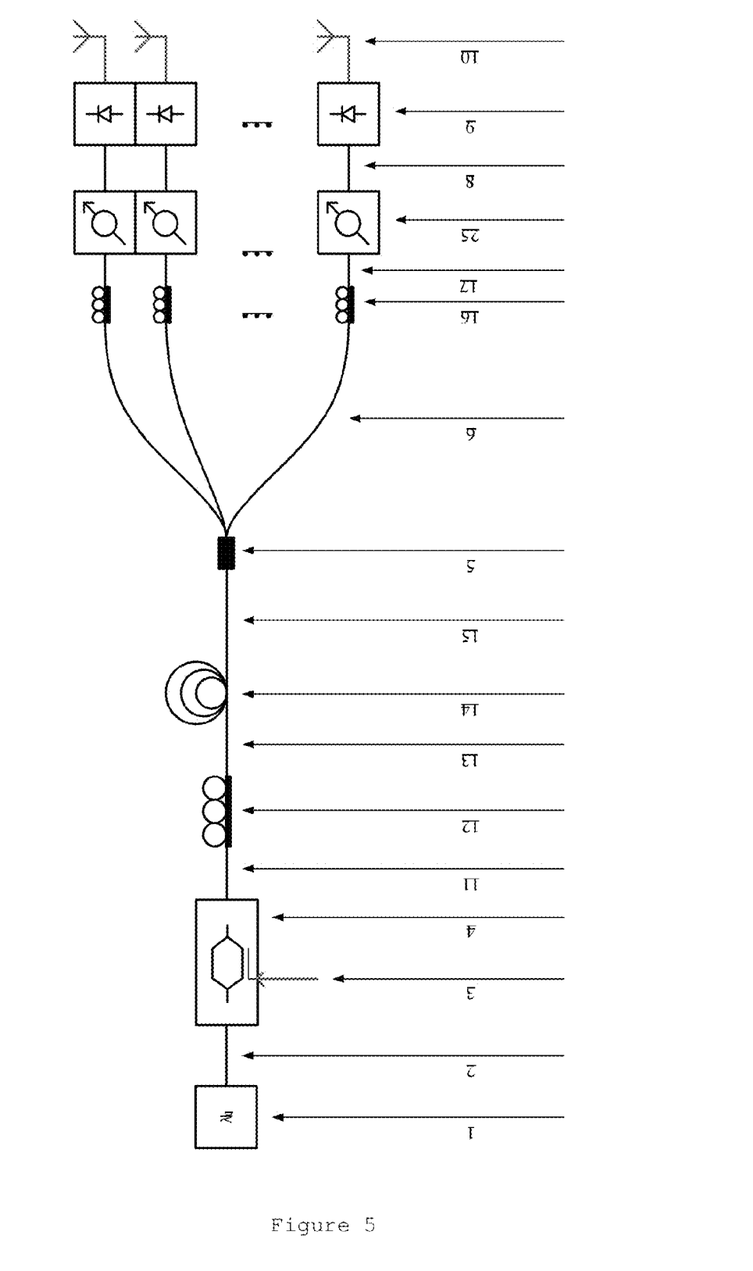
FIG. 5 shows a fourth embodiment of the invention.

The fourth embodiment is shown in FIG. 5. This embodiment is quite similar to the second embodiment sharing most of its functioning, but differs in the following details. The polarizers (18) were replaced by VOA's (25) sensitive to the polarization. This device allows an independent attenuation for the SOP's of the input optical signal. The PC's (16) are used to align the polarization orthogonal axes of the birefringent medium (14) with the polarization orthogonal axes of the device (25). As a consequence of the replacement of polarizers (18) by devices (25), the polarization orthogonal signals are not added to the electrical domain. In this embodiment, the polarization orthogonal signals are simultaneously added in the photodetection process, which means the electrical signal consists in adding the polarization orthogonal signals detected. The MZDI's are therefore partly implemented both on the optical and electrical domains. The coupling ratio can be tuned through the adjustment of the VOA's (25) sensitive to polarization. To perform the addition in the electrical domain, one needs that the phase information of the orthogonally polarized optical signals is preserved at the electrical domain. As a result, this embodiment is limited to optical signals with SSB modulation. The main difference between this and the second embodiment relates to the fact that this embodiment has a incoherent operation, unlike the third embodiment where orthogonally polarized optical signals are coherently added in optical domain polarization. Briefly, the beamforming of the radiated electrical field is defined through the tuning of devices (25).

Figure 6:
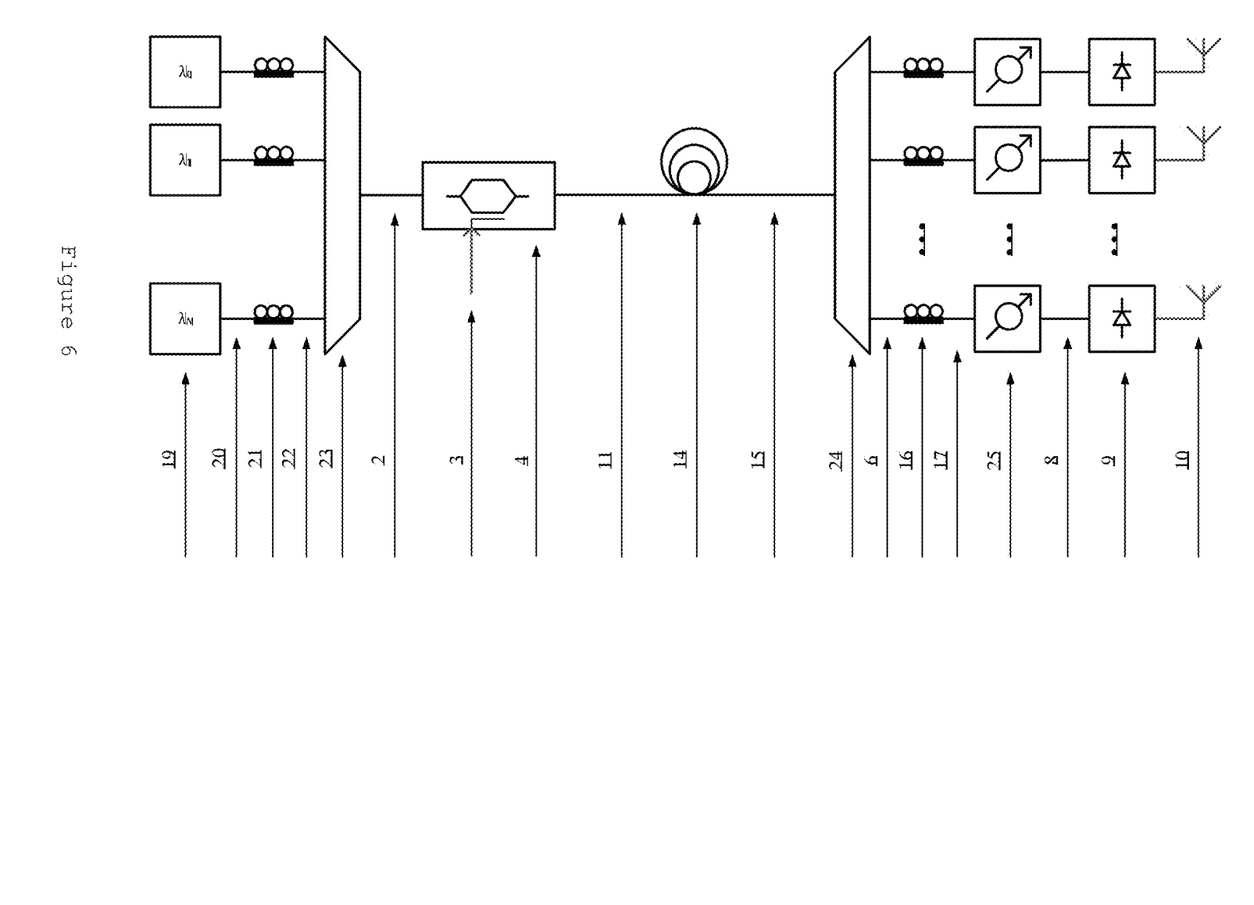
FIG. 6 shows a fifth embodiment of the invention.

The fifth embodiment is shown in FIG. 6. This embodiment is quite similar to the third embodiment sharing most of its functioning, but differs in the following details. The polarizers (18) are replaced by VOA's (25) sensitive to polarization. The PC's (16) are used to align the orthogonal axes in the polarization of the birefringent medium (14) with the polarization orthogonal axes of the device (25). The purpose of these modifications is explained in fourth embodiment. Therefore, this embodiment is also limited to optical signals with SSB modulation. The main difference between this and the third embodiment relates to the fact that this embodiment has a incoherent operation, unlike the third embodiment where orthogonally polarized optical signals are coherently added in optical domain polarization. Briefly, the beamforming of the radiated electrical field is defined through the tuning of devices (25).

The invention claimed is:
1. A photonic system to perform tunable beamforming of an electric field radiated by a phased array antenna, the system comprising:
   at least one monochromatic light source,
   an electro-optic modulator, and
   a 1 to N optical signal splitter, wherein each of N outputs of the 1 to N optical signal splitter is optically connected to at least one Mach-Zehnder delay interferometer, a photodetector and one of N elementary antennas that compose the phased array antenna.

2. The photonic system to perform the tunable beamforming of the electric field radiated by the phased array antenna according to claim 1,
- wherein each Mach-Zehnder delay interferometer comprises an input optical coupler optically connected to at least two time delay lines with a time difference between them, which are optically connected to an output optical coupler; and
- wherein at least one of the input and output optical couplers of each Mach-Zehnder delay interferometer has a tunable coupling ratio.

3. The photonic system to perform the tunable beamforming of the electric field radiated by the phased array antenna according to claim 2,
- wherein each one of the at least N Mach-Zehnder delay interferometers represents a tunable delay line; and
- wherein time delay tuning in said at least two time delay lines is performed through control of the coupling ratio of at least one of the two optical couplers.

4. The photonic system to perform the tunable beamforming of the electric field radiated by the phased array antenna according to claim 2, wherein the coupling ratio of at least one of the optical couplers of at least N Mach-Zehnder delay interferometers is controlled to permit tuning of the radiated electric field beamforming.

5. The photonic system to perform the tunable beamforming of electric field radiated by the phased array antenna according to claim 1, further comprising N variable optical attenuators placed after the outputs of the 1 to N optical splitter in order to enable controlling power of detected N optical signals.

6. A method to perform beamforming of an electric field radiated by a phased array antenna,
- wherein at least one monochromatic light source is modulated by an RF signal, which is radiated using an electro-optic modulator; and
- wherein the at least one modulated signal is copied N times, where each copy is processed by at least one Mach-Zehnder delay interferometer with a tunable coupling ratio, being next converted to an electric domain through photodetection, and being then sent to the respective elementary antenna of the phased array antenna; throughout controlling the interferometers coupling ratio, the time delay associated to each one of the N copies is varied, and therefore the beamforming of the electric field radiated by the phased array antenna is controlled.

7. The method to perform the beamforming of the electric field radiated by the phased array antenna according to claim 6, wherein a photonic system for beamforming comprises a monochromatic light source, an electro-optic modulator and N Mach-Zehnder delay interferometers with tunable coupling ratio, the method comprising:
- the modulated signal is split with equal power by two propagation axes of a birefringent medium, obtaining at the output of the birefringent medium two polarization orthogonal optic signals, time delayed between each other by $\tau$;
- the polarization orthogonal optic signals are copied N times by an 1 to N optic signal splitter;
- the polarization orthogonal optic signals of each of the N copies are added using a polarizer;
- the coupling ratio of each Mach-Zehnder delay interferometer, and consequently the time delay of each copy, is tuned through the polarization controller, which is previous to the respective polarizer.

8. The method to perform the beamforming of the electric field radiated by a phased array antenna according to claim 6, wherein a photonic system for beamforming has N monochromatic light sources, multiplexed at the wavelength using a wavelength multiplexer optically connected to an electro-optic modulator which is optically connected to N Mach-Zehnder delay interferometers with tunable coupling ratio, the method comprising:
- the N modulated signals are introduced into a birefringent medium;
- the polarization of the N modulated signals introduced into the birefringent medium is adjusted using the polarization controllers which come after the N monochromatic sources;
- at the output of the birefringent medium, each wavelength multiplexed signal is de-multiplexed using a wavelength de-multiplexer, and the orthogonally polarized signals which compose each de-multiplexed signal are added using a polarizer; and
- the coupling ratio is defined by adjusting the polarization controllers which come after each monochromatic source and/or the polarization controllers which come before the polarizers.

9. The method to perform the beamforming of the electric field radiated by a phased array antenna according to claim 6, wherein a photonic system for beamforming has a monochromatic light source, an electro-optic modulator that converts the electric signal in an optic signal with single side band, and N optoelectric Mach-Zehnder delay interferometers with tunable coupling ratio, the method comprising:
- the modulated signal is divided with equal power between the two propagation axes of a birefringent medium, obtaining at the output of the birefringent medium two polarization orthogonal optic signals, time delayed between each other by $\tau$;
- the polarization orthogonal optic signals are copied N times by an 1 to N optic signal splitter;
- the polarization orthogonal signals of each of the N copies are attenuated independently by an optically variable attenuator, sensitive to polarization; and
- the coupling ratio, and consequently the time delay of each copy is tuned using optically variable attenuator, which is sensitive to polarization, that comes before the respective photodetector, which, in turn adds the polarization orthogonal signals detected simultaneously to the photodetection.

10. The method to perform the to perform the beamforming of the electric field radiated by a phased array antenna according to claim 6, wherein a photonic system for beamforming has N monochromatic light sources, multiplexed at wavelength using a wavelength multiplexer, optically connected to an electro-optic modulator, which converts the electric signal into an optical signal with single sideband, and in turn is optically connected to N Mach-Zehnder delay interferometers with tunable coupling ratio, the method comprising:
- the modulated signals are divided with equal power between the two propagation axis of a birefringent medium, through the adjustment of the polarization controllers that come after the N monochromatic sources and through the adjustment of one polarization controller that comes before the birefringent medium;
- at the output of the birefringent medium, each wavelength multiplexed signal is de-multiplexed using a wavelength de-multiplexer and the orthogonally polarized signals that compose each de-multiplexed signal are attenuated independently by an optically variable attenuator that is sensitive to polarization; and the coupling ratio, and consequently the time delay of each copy is tuned using optically variable attenuator, which is sensitive to polarization, that comes before the respective photodetector, which, in turn adds the polarization orthogonal signals detected simultaneously to the photodetection.

* * * * *